(12) United States Patent
Kawai et al.

(10) Patent No.: US 8,640,681 B2
(45) Date of Patent: Feb. 4, 2014

(54) CONTROL APPARATUS FOR INTERNAL COMBUSTION ENGINE

(75) Inventors: Takashi Kawai, Susono (JP); Yukihiro Sonoda, Sunto-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1127 days.

(21) Appl. No.: 12/375,290

(22) PCT Filed: Aug. 28, 2007

(86) PCT No.: PCT/JP2007/066614
§ 371 (c)(1),
(2), (4) Date: Jan. 27, 2009

(87) PCT Pub. No.: WO2008/026567
PCT Pub. Date: Mar. 6, 2008

(65) Prior Publication Data
US 2009/0314267 A1   Dec. 24, 2009

(30) Foreign Application Priority Data

Aug. 28, 2006 (JP) ................................ 2006-230508

(51) Int. Cl.
*F02B 13/00* (2006.01)
*F02D 41/06* (2006.01)
(52) U.S. Cl.
USPC .......................................... 123/575; 123/674
(58) Field of Classification Search
USPC ......... 123/674, 575, 299, 300, 304, 679, 685; 701/103, 104
See application file for complete search history.

(56) References Cited

U.S. PATENT DOCUMENTS

| 4,945,880 | A  | * | 8/1990  | Gonze et al. ................ | 123/674 |
| 6,009,371 | A  |   | 12/1999 | Kobayashi |  |
| 6,349,710 | B1 | * | 2/2002  | Kawai et al. ................ | 123/685 |
| 6,748,927 | B2 | * | 6/2004  | Joos et al. .................. | 123/478 |
| 6,758,201 | B2 | * | 7/2004  | Hosoi ........................ | 123/679 |
| 6,923,169 | B2 | * | 8/2005  | Demura et al. .............. | 123/674 |

(Continued)

FOREIGN PATENT DOCUMENTS

| CN | 1536211 A | 10/2004 |
| JP | 63 111254 | 5/1988 |

(Continued)

OTHER PUBLICATIONS

Office Action issued on Sep. 6, 2011 in the corresponding Chinese Patent Application No. 200780031868.6.

*Primary Examiner* — Mahmoud Gimie
*Assistant Examiner* — David Hamaoui
(74) *Attorney, Agent, or Firm* — Oblon, Spivak, McClelland, Maier & Neustadt, L.L.P.

(57) ABSTRACT

A control apparatus for an internal combustion engine that can prevent, for instance, an exhaust purification catalyst from being damaged when the employed fuel is changed to a fuel having different properties during an operation. If fuel learning is incomplete while a refueling record exists, the throttle opening of an internal combustion engine operable on a fuel that is obtained by mixing alcohol and gasoline at an arbitrary ratio is limited. Limiting the throttle opening makes it possible to avoid an entry into an operation region where fuel increase is performed. This prevents air-fuel ratio feedback control from being stopped when a fuel change occurs. Consequently, the use of an improper air-fuel ratio that may damage the catalyst can be definitely avoided.

6 Claims, 5 Drawing Sheets

(56) References Cited

U.S. PATENT DOCUMENTS

| | | | |
|---|---|---|---|
| 6,971,360 B2 * | 12/2005 | Katayama | 123/192.1 |
| 2004/0182378 A1 | 9/2004 | Oshimi et al. | |
| 2004/0209734 A1 | 10/2004 | Mitsutani | |
| 2004/0237951 A1 | 12/2004 | Abe | |

FOREIGN PATENT DOCUMENTS

| | | |
|---|---|---|
| JP | 5 5446 | 1/1993 |
| JP | 9 324693 | 12/1997 |
| JP | 11 107834 | 4/1999 |
| JP | 2000 104600 | 4/2000 |
| JP | 2000 205393 | 7/2000 |
| JP | 2001 173492 | 6/2001 |
| JP | 2004 278449 | 10/2004 |
| JP | 2004 308540 | 11/2004 |
| JP | 2004 316523 | 11/2004 |
| JP | 2005 83205 | 3/2005 |
| JP | 2005 90427 | 4/2005 |
| JP | 2005 98265 | 4/2005 |
| JP | 2005 120869 | 5/2005 |

* cited by examiner

CONTROL APPARATUS FOR INTERNAL COMBUSTION ENGINE

TECHNICAL FIELD

The present invention relates to a control apparatus for an internal combustion engine.

BACKGROUND ART

It is promoted that an alcohol-containing fuel obtained by mixing gasoline with alcohol, which is a biofuel extracted, for instance, from sugarcane, corn, or wood, be used as an automotive fuel. Under such a circumstance, flexible fuel vehicles (FFVs), which can use various types of fuels that differ in alcohol concentration (alcohol content), have been progressively studied for development purposes.

Gasoline and alcohol differ in stoichiometric air-fuel ratio. The stoichiometric air-fuel ratio for gasoline is approximately 14.6, whereas the stoichiometric air-fuel ratio, for instance, for ethanol is approximately 9. Therefore, the stoichiometric air-fuel ratio for an alcohol-containing fuel varies with its alcohol concentration. Consequently, when the employed fuel is changed to a fuel having a different alcohol concentration, it is necessary to change the air-fuel ratio accordingly.

In an internal combustion engine, feedback control is generally exercised over the air-fuel ratio in accordance with a signal output from an exhaust gas sensor that generates an output according to the air-fuel ratio of exhaust gas. While such air-fuel ratio feedback control is exercised, no problem arises even if the employed fuel is changed to a fuel having a different alcohol concentration, that is, a different stoichiometric air-fuel ratio. The reason is that the amount of fuel injection is automatically corrected so as to equalize the exhaust air-fuel ratio with the stoichiometric air-fuel ratio.

However, air-fuel ratio feedback control is stopped during fuel increase. Catalyst protection fuel increase is performed to prevent an exhaust purification catalyst from overheating. Power fuel increase is performed to generate a higher power. If the employed fuel is changed while air-fuel ratio feedback control is stopped, the air-fuel ratio difference brought about by the fuel change will not be fed back. Therefore, the fuel injection amount cannot be corrected. This may degrade emissions and driveability. In addition, the following problem may also arise.

Catalyst protection fuel increase is a correction that is made by increasing the fuel injection amount to provide an air-fuel ratio lower than the stoichiometric air-fuel ratio for the purpose of lowering the exhaust temperature by using fuel vaporization heat when the catalyst is likely to overheat. Let us now assume that the currently employed fuel injection amount is calculated to provide an air-fuel ratio of 12 in a situation where catalyst protection fuel increase is performed during an operation performed through the use of a fuel composed of 100% gasoline. Let us also assume that the employed fuel is changed to a fuel having a high alcohol concentration (e.g., a fuel having an alcohol concentration of 85%) while the catalyst protection fuel increase is performed. For a fuel having a high alcohol concentration, an air-fuel ratio of 12 is leaner than the stoichiometric air-fuel ratio. In this case, therefore, the effect of exhaust temperature decrease by the fuel vaporization heat lessens, thereby allowing the exhaust temperature to rise. As a result, the catalyst may become damaged, and in the worst case, may melt down.

Meanwhile, an air-fuel ratio control apparatus disclosed in JP-A-5-5446 stores in advance learned values for air-fuel ratio correction, sorts the stored learned values by alcohol concentration, allows an alcohol concentration sensor installed in a fuel tank to detect the alcohol concentration of fuel, and selectively uses a learned value in accordance with the alcohol concentration of fuel fed.

Patent Document 1: JP-A-5-5446
Patent Document 2: JP-A-2005-98265
Patent Document 3: JP-A-2005-90427
Patent Document 4: JP-A-9-324693

DISCLOSURE OF INVENTION

Problem to be Solved by the Invention

However, even when the alcohol concentration of fuel fed into the fuel tank differs from that of a currently used fuel, the fuel injected from an injector does not immediately change to the newly fed fuel. More specifically, the aforementioned prior art air-fuel ratio control apparatus cannot accurately determine the timing with which the fuel injected from the injector actually changes. Therefore, if a fuel change occurs while air-fuel ratio feedback control is stopped, the use of the aforementioned device does not solve the above problem.

The present invention has been made to solve the above problem. An object of the present invention is to provide an internal combustion engine control apparatus that can definitely avoid damaging, for instance, an exhaust purification catalyst when the employed fuel is changed to a fuel having different properties during an operation.

Means for Solving the Problem

First aspect of the present invention is a control apparatus for controlling an internal combustion engine operable on various fuels that differ in stoichiometric air-fuel ratio, the control apparatus comprising:

an exhaust gas sensor which is installed in an exhaust path of the internal combustion engine to generate an output according to the air-fuel ratio of exhaust gas;

air-fuel ratio feedback control means for exercising air-fuel ratio feedback control in accordance with an output from the exhaust gas sensor;

fuel learning means for performing fuel learning in order to correct an error arising from a fuel type in accordance with a feedback correction value calculated during the air-fuel ratio feedback control;

refueling detection means for detecting a fuel fed into a fuel tank; and air amount limitation means which, when the refueling detection means detects a fuel fed, limits an intake air amount of the internal combustion engine during a subsequent operation until the fuel learning is complete.

Second aspect of the present invention is a control apparatus for controlling an internal combustion engine operable on various fuels that differ in stoichiometric air-fuel ratio, the control apparatus comprising:

refueling detection means for detecting a fuel fed into a fuel tank;

calculation means which, when the refueling detection means detects a fuel fed, calculates elapsed time, mileage, or a cumulative fuel consumption amount during a subsequent operation; and air amount limitation means for limiting an intake air amount of the internal combustion engine until the calculated elapsed time, mileage, or cumulative fuel consumption amount reaches a predetermined judgment value.

Third aspect of the present invention is a control apparatus for controlling an internal combustion engine operable on various fuels that differ in stoichiometric air-fuel ratio, the control apparatus comprising:

a fuel property sensor which is installed in a fuel tank or a fuel path to detect fuel properties; and air amount limitation means for limiting an intake air amount of the internal combustion engine when there is a change in the fuel properties detected by the fuel property sensor.

Fourth aspect of the present invention is the control apparatus according to the third aspect, further comprising:

consumption amount calculation means which, when there is a change in the fuel properties detected by the fuel property sensor, calculates a cumulative fuel consumption amount after the change;

wherein the air amount limitation means limits the intake air amount until the cumulative fuel consumption amount reaches a predetermined judgment value.

Fifth aspect of the present invention is the control apparatus according to the fourth aspect, wherein the predetermined judgment value causes the intake air amount to be continuously limited until the fuel in a fuel path between the fuel property sensor and the leading end of an injector is entirely replaced.

Sixth aspect of the present invention is the control apparatus according to the fourth or the fifth aspect, further comprising:

fuel injection amount correction means which, when the cumulative fuel consumption amount reaches the predetermined judgment value, corrects a fuel injection amount in accordance with the fuel properties detected by the fuel property sensor.

ADVANTAGES OF THE INVENTION

When a fuel fed into a fuel tank is detected in an internal combustion engine operable on various fuels that differ in stoichiometric air-fuel ratio, the first aspect of the present invention can limit an intake air amount during a subsequent operation until fuel learning based on air-fuel ratio feedback control is complete. When a fuel fed into the fuel tank is detected, the fuel injected from an injector may change during a subsequent operation to a different fuel that differs in stoichiometric air-fuel ratio. If air-fuel ratio feedback control is exercised when a fuel change occurs, it is possible to properly correct the air-fuel ratio in accordance with a new fuel and learn the amount of correction required due to fuel difference as a fuel learned value. However, if air-fuel ratio feedback control is stopped to perform fuel increase before completion of fuel learning, the air-fuel ratio cannot be corrected to a value appropriate for the new fuel even when a fuel is changed. Therefore, the air-fuel ratio becomes improper during the fuel increase. This may not only degrade emissions and driveability but also damage an exhaust purification catalyst. Under the above circumstances, the first aspect of the present invention limits the intake air amount until fuel learning is complete, thereby preventing the internal combustion engine from entering an operation region where fuel increase is performed. This makes it possible to definitely prevent emissions and driveability from degrading and the exhaust purification catalyst from becoming damaged.

When a fuel fed into a fuel tank is detected in an internal combustion engine operable on various fuels that differ in stoichiometric air-fuel ratio, the second aspect of the present invention can limit the intake air amount during a subsequent operation until the elapsed time, mileage, or cumulative fuel consumption amount reaches a predetermined judgment value. When the predetermined judgment value is appropriate, the completion of fuel learning can be accurately judged by monitoring the elapsed time, mileage, or cumulative fuel consumption amount. Therefore, the second aspect of the present invention provides the same advantages as the first aspect.

When the fuel properties detected by a fuel property sensor, which is installed in the fuel tank or fuel path, are changed in an internal combustion engine operable on various fuels that differ in stoichiometric air-fuel ratio, the third aspect of the present invention can limit the intake air amount of the internal combustion engine. Therefore, when the fuel can be changed to a different type, it is possible to prevent the internal combustion engine from entering an operation region where fuel increase is performed. Consequently, the third aspect of the present invention can definitely prevent emissions and driveability from degrading and the exhaust purification catalyst from becoming damaged, as is the case with the first aspect.

The fourth aspect of the present invention can limit the intake air amount until a predetermined judgment value is reached by a cumulative fuel consumption amount prevailing after a fuel property change detected by the fuel property sensor. As far as the predetermined judgment value is appropriate, the limit on the intake air amount can be lifted when it can be judged that the fuel injected from the injector is certainly changed to a new one. In other words, the fourth aspect of the present invention can lift the limit on the intake air amount with appropriate timing.

The fifth aspect of the present invention can define the above judgment value so that the intake air amount remains limited until the fuel in a fuel path between the position at which the fuel property sensor is installed and the leading end of the injector is entirely replaced. This ensures that the intake air amount remains limited for a minimum required period.

When the cumulative fuel consumption amount reaches the above judgment value, that is, when it can be judged that the fuel injected from the injector is certainly changed to a new one, the sixth aspect of the present invention can correct the fuel injection amount in accordance with the fuel properties detected by the fuel property sensor. Therefore, the fuel injection amount (air-fuel ratio) correction required after a fuel change can be made with appropriate timing.

BEST MODE FOR CARRYING OUT THE INVENTION

Embodiments of the present invention will now be described below with reference to the accompanying drawings. Like elements in the drawings are designated by the same reference numerals and will not be redundantly described.

First Embodiment

Description of System Configuration

Figure 1:
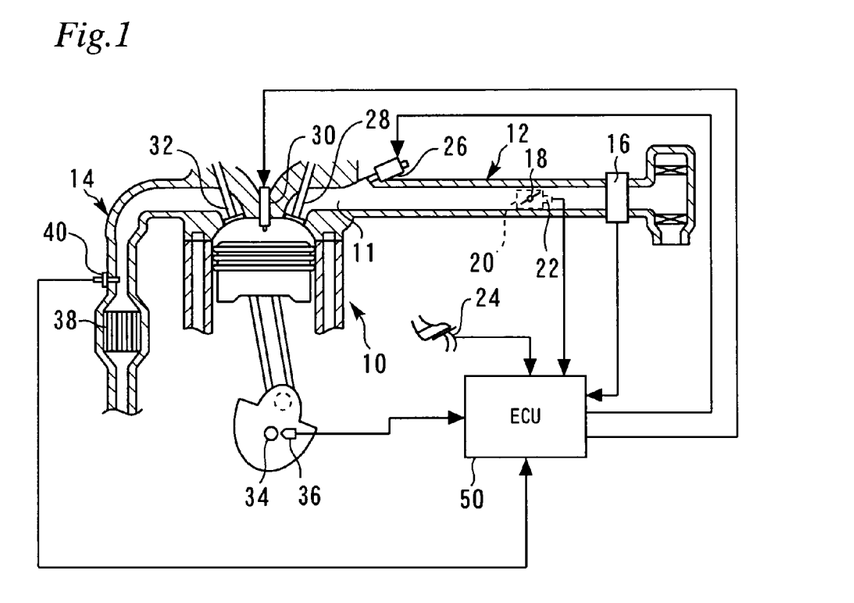
FIG. 1 is a diagram illustrating the configuration of a system according to a first embodiment of the present invention.

FIG. 1 is a diagram illustrating the configuration of a system according to a first embodiment of the present invention. As shown in FIG. 1, the system according to the present embodiment includes an internal combustion engine 10, which is mounted in a vehicle as a motive power source. It is assumed that the internal combustion engine 10 can operate on gasoline, alcohol (ethanol, methanol, or the like), or a mixed fuel composed of gasoline and alcohol (an alcohol-containing fuel).

The present embodiment assumes that the internal combustion engine 10 is of an in-line four-cylinder type. However, the present invention is not limited to the use of four cylinders and in-line cylinder arrangement. FIG. 1 is a cross-sectional view illustrating one cylinder of the internal combustion engine 10.

Each cylinder of the internal combustion engine 10 communicates with an intake path 12 and an exhaust path 14. An air flow meter 16 is installed in the intake path 12 to detect an intake air amount GA. A throttle valve 18 is installed downstream of the air flow meter 16 to control the intake air amount. The throttle valve 18 is an electronically controlled valve that is driven by a throttle motor 20 in accordance, for instance, with an accelerator opening. A throttle position sensor 22 is installed near the throttle valve 18 to detect the opening of the throttle valve 18 (hereinafter referred to as the "throttle opening"). The accelerator opening is detected by an accelerator position sensor 24, which is installed near an accelerator pedal.

Each cylinder of the internal combustion engine 10 includes an injector 26, which injects fuel into an intake port 11. The internal combustion engine 10 is not limited to a port injection engine, which is shown in the figure. It may alternatively be a direct injection engine, which directly injects fuel into a cylinder.

Each cylinder of the internal combustion engine 10 also includes an intake valve 28, an ignition plug 30, and an exhaust valve 32.

A crank angle sensor 36 is installed near a crankshaft 34 of the internal combustion engine 10 to detect the rotation angle of the crankshaft 34. The output of the crank angle sensor 36 can be used to detect, for instance, the rotational position of the crankshaft 34 and an engine speed NE.

A catalyst 38 is installed in the exhaust path 14 of the internal combustion engine 10 to purify exhaust gas. An $O_2$ sensor 40 is installed upstream of the catalyst 38 to generate an output that suddenly changes depending on whether the exhaust gas air-fuel ratio is richer or leaner than the stoichiometric air-fuel ratio.

The system according to the present embodiment also includes an ECU (Electronic Control Unit) 50. The ECU 50 is connected to the aforementioned various sensors and actuators. The ECU 50 is capable of controlling the operating status of the internal combustion engine 10 in accordance with outputs from the sensors.

Figure 2:
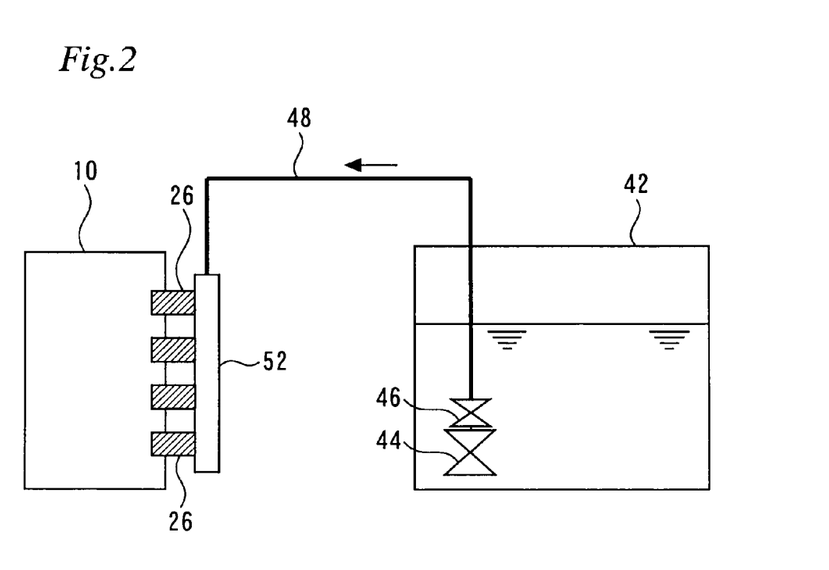
FIG. 2 is a schematic diagram illustrating a fuel system that supplies fuel to an internal combustion engine according to the first embodiment of the present invention.

FIG. 2 is a schematic diagram illustrating a fuel system that supplies fuel to the internal combustion engine 10. As shown in FIG. 2, the system according to the present embodiment includes a fuel tank 42 that stores fuel fed. A fuel pump 44 and a pressure regulator 46 are installed in the fuel tank 42. The fuel in the fuel tank 42 is pressurized by the fuel pump 44, pressure-regulated by the pressure regulator 46, and forwarded to the internal combustion engine 10 through a fuel pipe 48. The fuel is then distributed to the injector 26 of each cylinder through a delivery pipe 52.

Basic Control by Present Embodiment

Basic air-fuel ratio control exercised by the system according to the present embodiment will now be described below. The injector 26 injects a predetermined amount of fuel in accordance with fuel injection time TAU. Therefore, the ECU 50 controls the amount of fuel injection by controlling the fuel injection time TAU of the injector 26. The fuel injection time TAU is calculated by the following equation:

$$TAU = \alpha \times TP \times KT + \beta \quad (1)$$

In Equation (1) above, the symbol "TP" represents basic injection time. The basic injection time TP is the injection time for a basic fuel injection amount that is calculated, for instance, from the intake air amount GA detected by the air flow meter 16 and the engine speed NE. The symbol "α" represents a correction coefficient that is used, for instance, to perform catalyst protection fuel increase or power fuel increase. The symbol "β" represents invalid injection time, which is used to correct the delay in the operation of the injector 26. The symbol "KT" represents a correction coefficient that is composed of a feedback correction value FAF and a learned value KG. In other words, the correction coefficient KT is expressed by the following equation:

$$KT = FAF + KG \quad (2)$$

(Air-Fuel Ratio Feedback Control)

Figure 3:
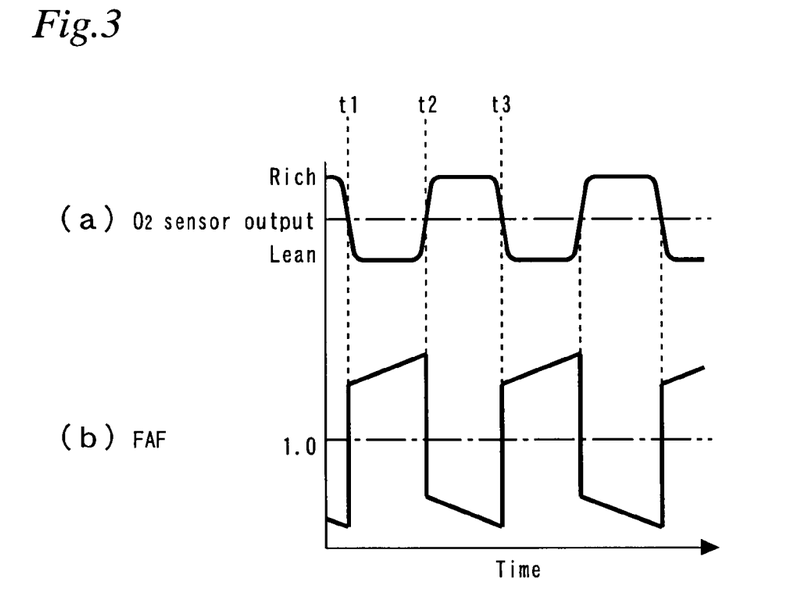
FIG. 3 is a timing diagram illustrating a method of calculating the feedback correction value FAF.

FIG. 3 is a timing diagram illustrating a method of calculating the feedback correction value FAF. More specifically, line (a) in FIG. 3 indicates changes in the output of the $O_2$ sensor 40, whereas line (b) in FIG. 3 indicates changes in the feedback correction value FAF. As shown in FIG. 3, the feedback correction value FAF is calculated so that it periodically varies around 1.0 while air-fuel ratio feedback control is exercised. The method of calculating the feedback correction value FAF will be described in detail below.

FIG. 3 shows that the output mode of the $O_2$ sensor 40 is lean during an interval between time t1 and time t2. It indicates that the air-fuel ratio of an exhaust gas discharged from the internal combustion engine 10 (hereinafter referred to as the "exhaust air-fuel ratio") is leaner than the stoichiometric air-fuel ratio. While the $O_2$ sensor 40 generates a lean output, the feedback correction value FAF is updated and gradually increased with a predetermined gradient. When the FAF is updated to a great value, the fuel injection time TAU increases, thereby causing the exhaust air-fuel ratio to change from lean to rich before long. The output of the $O_2$ sensor 40 then also changes from lean to rich (time t2).

When it is detected that the output of the $O_2$ sensor 40 is changed from lean to rich, the ECU 50 drastically decreases the feedback correction value FAF (time t2). Subsequently, the FAF is updated and gradually decreased with a predetermined gradient as far as the output of the $O_2$ sensor 40 remains rich. When the FAF is updated to a small value, the fuel injection time TAU decreases, thereby causing the exhaust air-fuel ratio to change from rich to lean before long. The output of the $O_2$ sensor 40 then also changes from rich to lean (time t3).

When it is detected that the output of the $O_2$ sensor 40 is changed from rich to lean, the ECU 50 drastically increases the feedback correction value FAF (time t3). Subsequently, the FAF is updated in a manner described above and gradually increased with a predetermined gradient as far as the output of the $O_2$ sensor 40 remains lean.

While air-fuel ratio feedback control is exercised, the above process is repeatedly performed to alternately increase and decrease the feedback correction value FAF in accordance with the exhaust air-fuel ratio. Further, when the FAF alternately increases and decreases, the air-fuel ratio of the internal combustion engine 10 remains close to the stoichiometric air-fuel ratio.

In addition to the calculations of the feedback correction value FAF, the ECU 50 calculates a smoothed value FAFAV, which is a time average of the feedback correction value FAF. While air-fuel ratio feedback control is ideally exercised, the smoothed value FAFAV is 1.0 because the feedback correction value FAF varies around 1.0. However, if the air-fuel ratio tends to be richer than the stoichiometric air-fuel ratio due, for instance, to individual variability of the air flow meter 16 or injector 26, the FAF varies around a value smaller than 1.0 in order to offset such a tendency. In this instance, the FAFAV is smaller than 1.0. If, on the other hand, the air-fuel ratio tends to be leaner than the stoichiometric air-fuel ratio, the FAFAV is greater than 1.0 because the FAF varies around a value greater than 1.0.

In other words, the deviation (FAFAV-1.0) between the smoothed value FAFAV of the feedback correction value FAF and a reference value of 1.0 can be regarded as a stedy error that is involved in air-fuel ratio control. To learn such a steady error, the ECU 50 performs a process for periodically incorporating the deviation (FAFAV-1.0) into the learned value KG.

If the air-fuel ratio tends to be richer or leaner than the stoichiometric air-fuel ratio due, for instance, to aging of the internal combustion engine 10, the above method enables the learned value KG to offset such a tendency. Consequently, the feedback correction value FAF can be constantly varied around a reference value of 1.0.

(Fuel Learning)

As mentioned earlier, the stoichiometric air-fuel ratio varies with the alcohol concentration of fuel. More specifically, the stoichiometric air-fuel ratio decreases with an increase in the alcohol concentration (with an increase in the degree of closeness to 100% alcohol) and increases with a decrease in the alcohol concentration (with an increase in the degree of closeness to 100% gasoline). In a situation where the fuel injection amount (air-fuel ratio) remains unchanged, therefore, the air-fuel ratio becomes leaner than the stoichiometric air-fuel ratio when the alcohol concentration increases, and becomes richer than the stoichiometric air-fuel ratio when the alcohol concentration decreases.

Consequently, when the alcohol concentration of fuel burned in the internal combustion engine 10 changes because newly fed fuel differs from the currently used fuel in alcohol concentration, the air-fuel ratio tends to be richer or leaner than the stoichiometric air-fuel ratio. Even in this case, the aforementioned learned value KG can offset such a tendency. Therefore, even when the alcohol concentration of fuel is changed, exercising air-fuel ratio feedback control as described above makes it possible to ensure that the air-fuel ratio of the internal combustion engine 10 agrees with the fuel's stoichiometric air-fuel ratio.

The present embodiment assumes that the learned value KG is composed of a normal learned value KGN, which is used to correct an air-fuel ratio deviation resulting, for instance, from aging of the internal combustion engine 10, and a fuel learned value KGF, which is used to correct an air-fuel ratio deviation resulting from a difference in fuel type (alcohol concentration), and calculates the normal learned value KGN and fuel learned value KGF distinctly. Although the learned value KG may contain some other learned values, the present embodiment assumes that the learned value KG is composed of the normal learned value KGN and fuel learned value KGF. In other words, the learned value KG according to the present embodiment is expressed by the following equation:

$$KG = KGN + KGF \quad (3)$$

If a fuel having a different alcohol concentration is fed into the fuel tank, the alcohol concentration of the fuel injected from the injector 26 changes during a subsequent operation. Therefore, if the air-fuel ratio is biased during an operation subsequent to refueling, that is, if a deviation (FAFAV-1.0) arises between the smoothed value FAFAV of the feedback correction value FAF and a reference value of 1.0, it is highly probable that the deviation is caused by a change in the alcohol concentration of fuel. Thus, the deviation (FAFAV-1.0) encountered during a certain period after refueling is considered to be a consequence of a fuel change and incorporated into the fuel learned value KGF.

When the fuel learned value KGF converges to a substantially fixed value in fuel learning described above, it can be judged that fuel learning is complete. Therefore, if the air-fuel ratio is biased subsequently, it is conceivable that such a bias is caused by a common factor such as aging of the internal combustion engine 10. After completion of fuel learning, therefore, the deviation (FAFAV-1.0) is incorporated into the normal learned value KGN.

(Catalyst Protection Fuel Increase)

When it is anticipated that the temperature of the catalyst 38 may excessively rise, the system performs catalyst protection fuel increase in order to prevent the catalyst 38 from deteriorating and becoming damaged. This catalyst protection fuel increase will be described below.

The relationship between the convergence temperature of the catalyst 38, the engine load, and the engine speed NE during a steady operation has been investigated in advance. The system stores this relationship as a map in the ECU 50. The ECU 50 constantly performs calculations to estimate the temperature of the catalyst 38 in accordance with the map (hereinafter referred to as the "catalyst convergence temperature map"), the current engine load, and the current engine speed NE. When the estimated temperature of the catalyst 38 exceeds a predetermined temperature for fuel increase (permissible temperature), catalyst protection fuel increase is performed to protect the catalyst 38 by allowing the fuel vaporization heat to lower the exhaust temperature.

When catalyst protection fuel increase is performed, the fuel injection amount is increased to provide an air-fuel ratio that is richer than the stoichiometric air-fuel ratio. Meanwhile, air-fuel ratio feedback control based on the aforementioned feedback correction value FAF is exercised to ensure that the air-fuel ratio agrees with the stoichiometric air-fuel ratio. Therefore, when catalyst protection fuel increase is performed, air-fuel ratio feedback control is stopped to avoid interference. Consequently, the fuel injection amount (air-fuel ratio) is open-loop controlled.

As mentioned earlier, the stoichiometric air-fuel ratio varies with the alcohol concentration of fuel. Therefore, the ideal air-fuel ratio for catalyst protection fuel increase also varies with the alcohol concentration of fuel. When fuel learning is complete, the air-fuel ratio for catalyst protection fuel increase can also be properly corrected by the fuel learned value KGF.

However, if catalyst protection fuel increase is performed when fuel learning is still not complete after the fuel injected from the injector 26 (hereinafter referred to as the "injected fuel") is changed to a fuel having a different alcohol concentration, the following problem arises.

Let us now assume that catalyst protection fuel increase is performed immediately after the fuel actually injected from the injector 26 is changed from a fuel composed of 100% gasoline to a fuel having a high alcohol concentration (e.g., having an alcohol concentration of 85%). In this instance, the fuel learned value KGF is adapted to a fuel composed of 100% gasoline because fuel learning is still not complete. Consequently, when catalyst protection fuel increase is performed in the above instance, the amount of fuel to be injected from the injector 26 is calculated so as to provide an air-fuel ratio richer than the stoichiometric air-fuel ratio for a fuel composed of 100% gasoline (e.g., an air-fuel ratio of 12). However, the fuel actually injected from the injector 26 has a high alcohol concentration, that is, a low stoichiometric air-fuel ratio. Therefore, if the fuel is injected at an air-fuel ratio of 12, combustion occurs at an air-fuel ratio that is leaner than the stoichiometric air-fuel ratio. As a result, the effect of exhaust temperature decrease by the fuel vaporization heat lessens, thereby allowing the exhaust temperature to rise. In other words, the temperature of the catalyst 38 continues to rise in a situation where it should be lowered. Consequently, the catalyst 38 may become damaged, and in the worst case, may melt down.

The above phenomenon also occurs when the injected fuel is changed from a fuel having a low alcohol concentration (instead of a fuel composed of 100% gasoline) to a fuel having a high alcohol concentration.

If, on the contrary, catalyst protection fuel increase is performed immediately after the injected fuel is changed from a fuel having a high alcohol concentration to a fuel having a low alcohol concentration, the air-fuel ratio becomes excessively rich, thereby degrading the combustion quality and emissions.

Further, the above phenomenon may also occur when fuel increase other than catalyst protection fuel increase is performed. Other fuel increase is, for instance, power fuel increase in response to a fully-opened throttle. However, the following description mainly deals with catalyst protection fuel increase.

Features of First Embodiment

To overcome the above problem, the present embodiment exercises control to limit the intake air amount (throttle opening) during an operation subsequent to refueling into the fuel tank 42 until fuel learning is complete. Exercising control in this manner makes it possible to prevent an excessive rise in the temperature of the catalyst 38. Since this eliminates the necessity of catalyst protection fuel increase, it is possible to definitely avoid the above problem.

Details of Process Performed by First Embodiment

Figure 4:
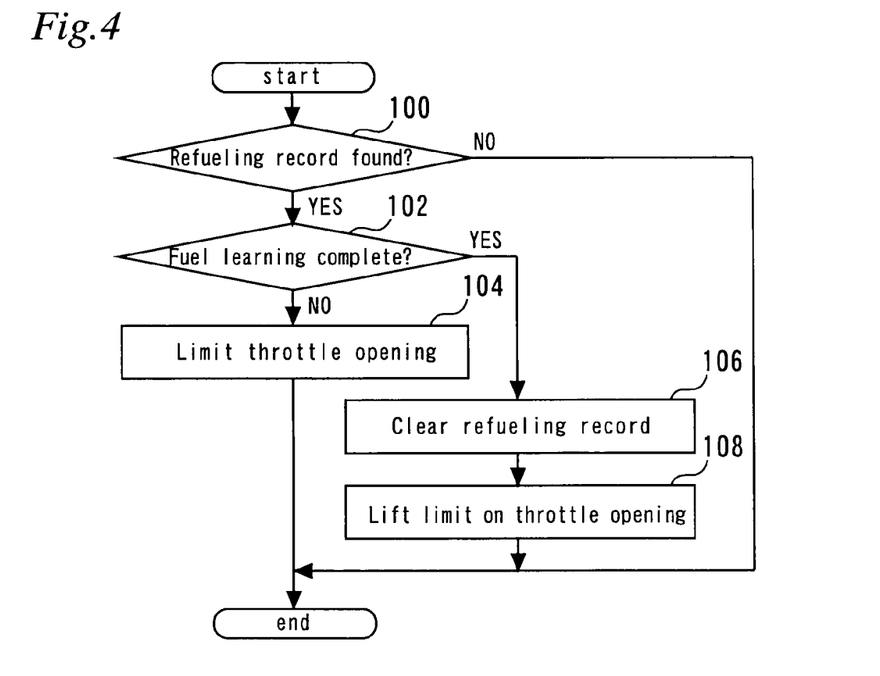
FIG. 4 is a flowchart illustrating a routine that is executed by the first embodiment of the present invention.

FIG. 4 is a flowchart illustrating a routine that the ECU 50 according to the present embodiment executes to implement the functionality described above. It is assumed that the routine is repeatedly executed at predetermined time intervals. First of all, the routine shown in FIG. 4 performs step 100 to judge whether a refueling record exists, indicating that a fuel is fed. It is assumed that the present embodiment checks the status, for instance, of a sender gauge (level gauge), which is installed in the fuel tank 42, a fuel lid of a vehicle in which the internal combustion engine 10 is mounted, and an ORVR (Onboard Refueling Vapor Recovery) system (none of these items are shown) to detect whether a fuel is fed. When a fuel fed is detected, the routine judges that a refueling record exists.

If the judgment result obtained in step 100 does not indicate that a refueling record exists, it can be concluded that the fuel injected from the injector 26 will not possibly change to a fuel having a different alcohol concentration. In this instance, therefore, the current processing cycle comes to an immediate end.

If, on the other hand, the judgment result obtained in step 100 indicates that a refueling record exists, it can be concluded that the fuel injected from the injector 26 is about to change or has already changed to a fuel having a different alcohol concentration. In this instance, next, step 102 is performed to judge whether fuel learning is complete. Fuel learning can be judged to be complete when, for instance, the smoothed value FAFAV of the feedback correction value FAF remains within a judgment range $(1.0-\gamma \leq \text{FAFAV} \leq 1.0+\gamma)$, which is defined by a predetermined judgment value $\gamma$, for a period of time not shorter than predetermined judgment time $\tau$.

If the judgment result obtained in step 102 does not indicate that fuel learning is complete, the routine proceeds to step 104. In step 104, control is exercised to limit the throttle opening in such a manner that the temperature of the catalyst 38 does not reach the fuel increase temperature. More specifically, the engine load and engine speed NE curves for causing the catalyst convergence temperature indicated in the catalyst convergence temperature map to agree with the fuel increase temperature are determined to use the throttle opening at a specific point of the curves as an upper-limit throttle opening. Further, control is exercised so that the actual throttle opening is smaller than the upper-limit throttle opening. An alternative would be to leave the throttle opening unlimited while the estimated temperature of the catalyst 38 is sufficiently lower than the fuel increase temperature, and exercise control to keep the throttle opening smaller than the upper-limit throttle opening when the estimated temperature of the catalyst 38 is close to the fuel increase temperature.

When step 102 is performed as described above, it is possible to prevent the temperature (estimated temperature) of the catalyst 38 from rising to the fuel increase temperature. Therefore, catalyst protection fuel increase can be definitely avoided before completion of fuel learning. In other words, it is possible to definitely avoid the termination of air-fuel ratio feedback control. Consequently, the aforementioned problem can be definitely avoided.

When fuel learning control is progressively exercised to complete fuel learning after the injected fuel is changed to a new fuel, the fuel learned value KGF becomes appropriate for the new fuel. From now on, even if catalyst protection fuel increase is performed, that is, even if air-fuel ratio feedback control is stopped, the fuel injection amount can be calculated to provide an appropriate air-fuel ratio for the new fuel. This eliminates the necessity of limiting the intake air amount. As such being the case, when the judgment result obtained in step 102 indicates that fuel learning is complete, step 106 is performed to clear the refueling record (so that no refueling record exists). Next, step 108 is performed to lift the limit on the throttle opening, which was limited in step 104.

It should be noted that step 102 is performed to limit the throttle opening (intake air amount). Step 102 does not disable the capability of catalyst protection fuel increase. While the capability of catalyst protection fuel increase is disabled, the catalyst 38 may become damaged because the temperature of the catalyst 38 cannot be lowered if the temperature of the catalyst 38 should excessively rise for some reason. However, the present embodiment can properly protect the catalyst 38 because it can lower the temperature of the catalyst 38 in such a situation.

Further, the routine shown in FIG. 4 can prevent the internal combustion engine 10 from entering a region where fuel increase (e.g., power fuel increase) other than catalyst protection fuel increase is provided before completion of fuel learning. This makes it possible to definitely protect the catalyst 38.

Although step 104 is performed to limit the intake air amount by limiting the throttle opening, the present invention is not limited to the use of such an intake air amount limitation method. When, for instance, the internal combustion engine includes a variable valve train that is capable of continuously varying the operating angle and lift amount of the intake valve 28, the intake air amount may alternatively be limited by limiting the operating angle and lift amount of the intake valve 28.

Meanwhile, the system according to the present embodiment has a returnless fuel system, which does not have a return path from the internal combustion engine 10 to the fuel tank 42 as shown in FIG. 2. Even after a new, different fuel is fed into such a returnless fuel system, the injected fuel does not change to the new fuel until the previous fuel remaining in the fuel path between the fuel tank 42 and injector 26 is consumed. In other words, the injected fuel does not possibly change to the newly fed fuel during a period immediately after the resumption of an operation subsequent to refueling. Therefore, there is no need to immediately start limiting the intake air amount in step 104. Consequently, an alternative would be to calculate a cumulative fuel consumption amount, which is reached after refueling, in accordance with the amount of fuel injected from the injector 26, and postpone the start of intake air amount control until the cumulative fuel consumption amount reaches a value that can change the injected fuel to the new fuel. The use of this alternative can minimize the period during which the intake air amount is limited, that is, the period during which the output of the internal combustion engine 10 is limited.

When, on the other hand, a return fuel system is employed so that there is a return path from the internal combustion engine 10 to the fuel tank 42, the fuel in the fuel pipe 48 and delivery pipe 52 constantly circulates during an operation. Therefore, when an operation resumes after refueling, the fuel in the fuel pipe 48 and delivery pipe 52 is immediately replaced with a new one. Consequently, when an operation resumes after refueling, the injected fuel is replaced with the new one before long. Therefore, when a return fuel system is used, it is preferred that the intake air amount be limited immediately after the resumption of an operation subsequent to refueling.

In the first embodiment, which has been described above, the $O_2$ sensor 40 corresponds to the "exhaust gas sensor" according to the first aspect of the present invention. Further, the "air-fuel ratio feedback control means" according to the first aspect of the present invention is implemented when the ECU 50 performs a process for calculating the feedback correction value FAF; the "fuel learning means" according to the first aspect of the present invention is implemented when the ECU 50 performs a process for calculating the fuel learned value KGF; the "refueling detection means" according to the first aspect of the present invention is implemented when the ECU 50 performs step 100; and the "air amount limitation means" according to the first aspect of the present invention is implemented when the ECU 50 performs steps 102 to 108.

The present invention is not limited to the use of the above-described methods of air-fuel ratio feedback control and fuel learning control, and permits the use of any other methods. The present invention can also be applied to a system in which an A/F sensor for generating a linear output in accordance with the exhaust air-fuel ratio is used as an exhaust gas sensor instead of the $O_2$ sensor 40, and to a system having a plurality of exhaust gas sensors.

Second Embodiment

A second embodiment of the present invention will now be described with reference to FIG. 5. However, the differences between the second embodiment and the first embodiment described above will be mainly described while skipping the description of matters common to these embodiments. The second embodiment can be implemented when it uses the same system configuration as the first embodiment and causes the ECU 50 to execute a later-described routine shown in FIG. 5.

When refueling is detected, the first embodiment limits the intake air amount until fuel learning is complete. In almost all cases, the time required for the completion of fuel learning is not extremely long although it varies with the operating status of the internal combustion engine 10. Therefore, when an appropriate amount of time elapses after the resumption of an operation subsequent to refueling, it can be estimated that fuel learning is complete. As such being the case, the second embodiment lifts the limit on the intake air amount when the elapsed time since the resumption of the operation subsequent to refueling reaches predetermined judgment time.

Details of Process Performed by Second Embodiment

Figure 5:
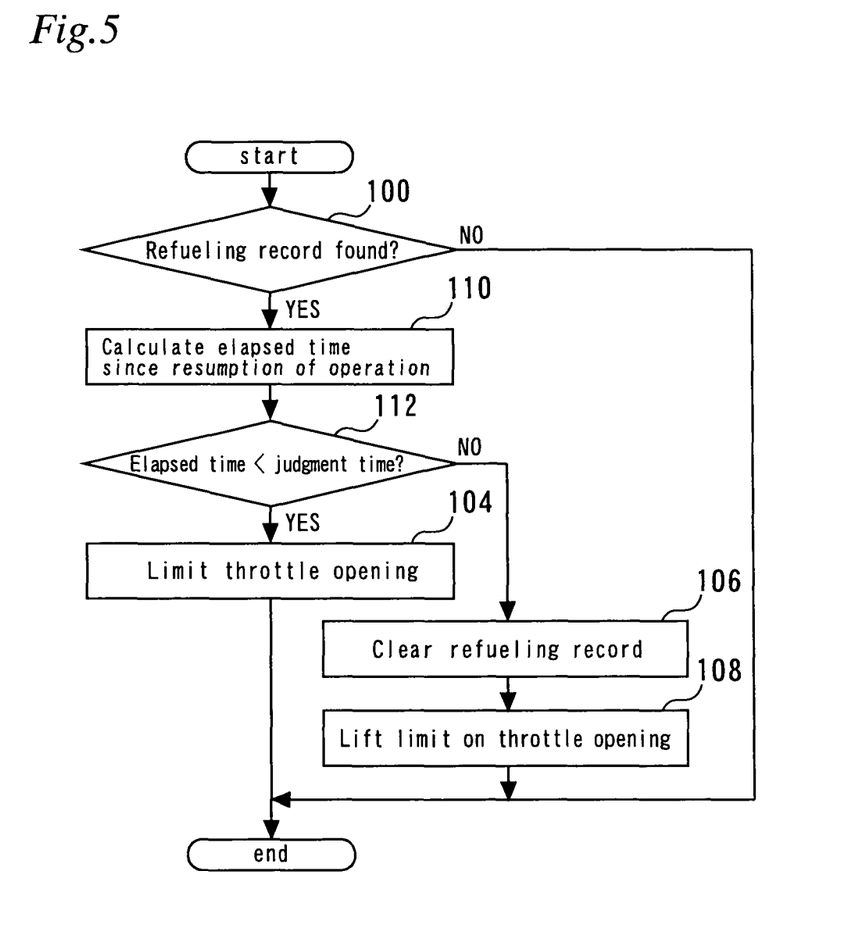
FIG. 5 is a flowchart illustrating a routine that is executed by a second embodiment of the present invention.

FIG. 5 is a flowchart illustrating a routine that the ECU 50 according to the present embodiment executes to implement the functionality described above. It is assumed that the routine is repeatedly executed at predetermined time intervals. When the steps in FIG. 5 are identical with those in FIG. 4, their description will be omitted or abridged with the same reference numerals assigned. The routine shown in FIG. 5 is the same as the routine shown in FIG. 4 except that the former performs step 112 instead of step 102 and performs step 110 between steps 100 and 112.

If the judgment result obtained in step 100 indicates that a refueling record exists, the routine shown in FIG. 5 performs step 110 to calculate the elapsed time since the internal combustion engine 10 resumed its operation after refueling. Next, the routine performs step 112 to judge whether the elapsed time has reached predetermined judgment time. The judgment time is predetermined as the time that indicates the completion of fuel learning with sufficiently high probability.

Therefore, if the judgment result obtained in step 112 does not indicate that the elapsed time has reached the judgment time, it can be concluded that fuel learning may be incomplete. In this instance, the routine proceeds to step 104. In step 104, control is exercised to limit the throttle opening. If, on the other hand, the judgment result obtained in step 112 indicates that the elapsed time has reached the judgment time, it can be estimated that fuel learning is complete. In this instance, step 106 is performed to clear the refueling record. Next, step 108 is performed to lift the limit on the throttle opening, which was limited in step 104.

Executing the routine shown in FIG. 5 as described above provides the same advantages as the first embodiment. Although the routine shown in FIG. 5 checks the elapsed time since an operation resumed after refueling to estimate whether fuel learning is complete, it is also possible to similarly estimate the completion of fuel learning in accordance with the mileage or cumulative fuel consumption amount. More specifically, step 112 may be performed to judge whether the mileage or cumulative fuel consumption amount attained since the resumption of an operation subsequent to refueling has reached an appropriate judgment value. Further, the limit on the throttle opening may be lifted when the judgment value is reached.

In the second embodiment, which has been described above, the "refueling detection means" according to the second aspect of the present invention is implemented when the ECU 50 performs step 100; the "calculation means" according to the second aspect of the present invention is implemented when the ECU 50 performs step 110; and the "air amount limitation means" according to the second aspect of the present invention is implemented when the ECU 50 performs steps 112, 104, 106, and 108.

Third Embodiment

A third embodiment of the present invention will now be described with reference to FIGS. 6 and 7. However, the differences between the third embodiment and the embodiments described earlier will be mainly described while abridging or omitting the description of matters common to these embodiments.

Figure 6:
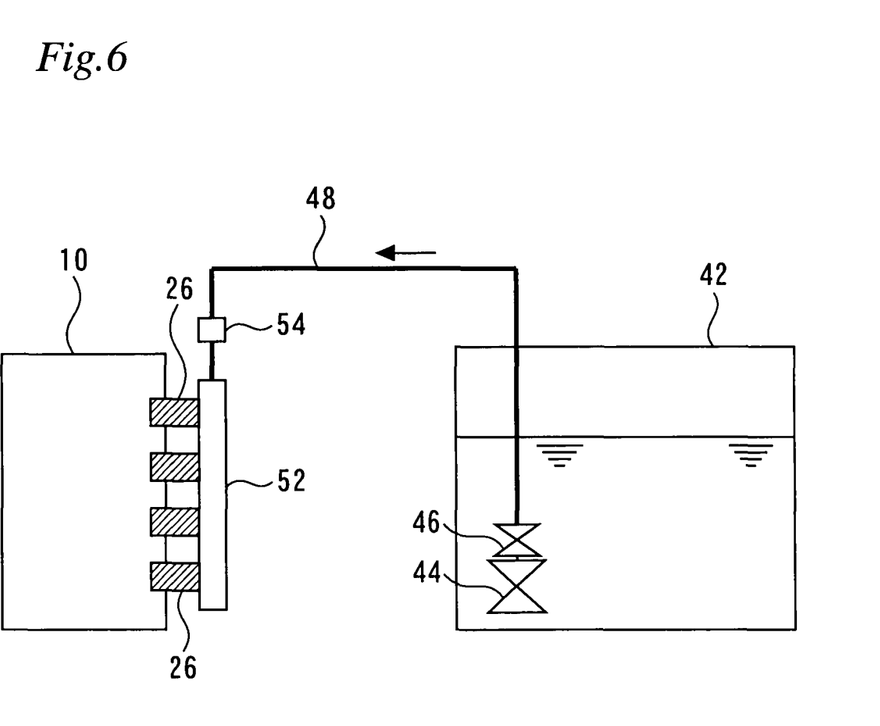
FIG. 6 is a schematic diagram illustrating a fuel system that supplies fuel to an internal combustion engine according to a third embodiment of the present invention.

FIG. 6 is a schematic diagram illustrating a fuel system in a system according to the present embodiment. As shown in FIG. 6, the fuel system according to the present embodiment is of the same returnless type as the fuel system shown in FIG. 2, and identical with the fuel system shown in FIG. 2 except that an alcohol concentration sensor 54 is installed in the middle of the fuel pipe 48.

The alcohol concentration sensor 54 is a publicly known sensor that is capable of detecting the alcohol concentration in fuel by measuring, for instance, the electric conductivity, electric permittivity, optical transmittance, or refractive index of the fuel. When a different fuel is fed to change the alcohol concentration of fuel passing through the fuel pipe 48, the output of the alcohol concentration sensor 54 changes. In the present embodiment, the ECU 50 can detect a fuel change by constantly monitoring the output of the alcohol concentration sensor 54. The alcohol concentration sensor 54 may alternatively be installed, for instance, in the delivery pipe 52 or fuel tank 42.

The stoichiometric air-fuel ratio of fuel is determined in accordance with the fuel's alcohol concentration. Thus, an ideal air-fuel ratio for burning the fuel in the internal combustion engine 10 can be determined from the fuel's alcohol concentration. When a fuel change occurs, therefore, the ECU 50 according to the present embodiment can properly correct the fuel injection amount to provide an air-fuel ratio appropriate for a new fuel after fuel change occurs in accordance with the alcohol concentration detected by the alcohol concentration sensor 54.

However, when a fuel change is detected by the alcohol concentration sensor 54, the previously used fuel remains in the fuel pipe 48, delivery pipe 52, and injector 26, which are installed downstream of the alcohol concentration sensor 54. Therefore, the fuel injected from the injector 26 changes after the remaining fuel is consumed.

Consequently, when a fuel change is detected by the alcohol concentration sensor 54, the present embodiment calculates the cumulative fuel consumption amount reached since fuel change detection. Further, when the cumulative fuel consumption amount reaches a predetermined judgment value indicating that the remaining fuel is definitely consumed, the present embodiment corrects the fuel injection amount in accordance with the alcohol concentration of the new fuel.

Before the cumulative fuel consumption amount reaches the judgment value, there is no telling whether the new fuel or previous fuel is actually injected from the injector 26. Therefore, if fuel increase is performed before the cumulative fuel consumption amount reaches the judgment value to stop air-fuel ratio feedback control, the resulting air-fuel ratio may be improper for the actually injected fuel. This may damage the catalyst 38 or cause other problems as described earlier. Before the cumulative fuel consumption amount reaches the judgment value, therefore, the present embodiment avoids an entry into a fuel increase region by limiting the throttle opening (intake air amount) as is the case with the first embodiment.

While the cumulative fuel consumption amount is sufficiently smaller than the cubic capacity of the fuel path between the alcohol concentration sensor 54 and the leading end of the injector 26, it can be definitely judged that the previous fuel is still actually injected. During such a period, therefore, it is not necessary to limit the throttle opening. Consequently, while it can be definitely judged that the previous fuel is still actually injected even after a fuel change is detected by the alcohol concentration sensor 54, the present embodiment refrains from limiting the throttle opening.

Details of Process Performed by Third Embodiment

Figure 7:
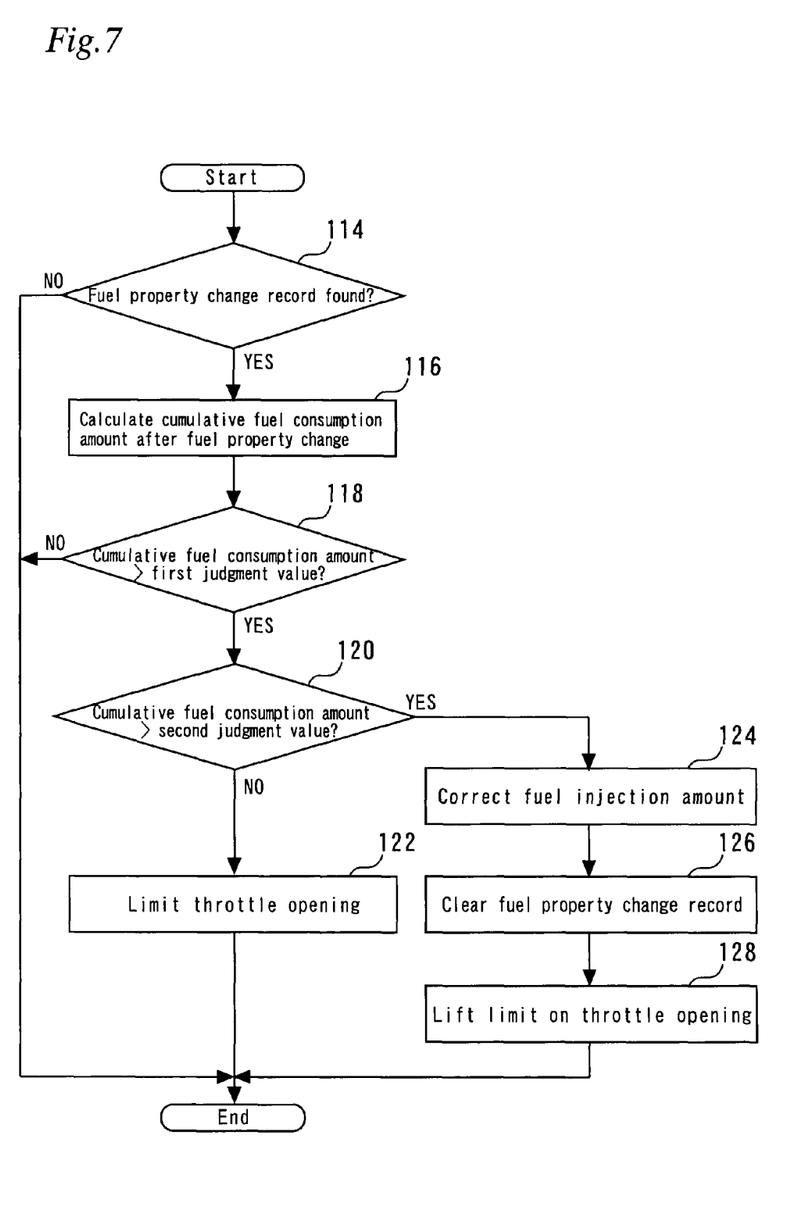
FIG. 7 is a flowchart illustrating a routine that is executed by the third embodiment of the present invention.

FIG. 7 is a flowchart illustrating a routine that the ECU 50 according to the present embodiment executes to implement the functionality described above. It is assumed that the routine is repeatedly executed at predetermined time intervals.

First of all, the routine shown in FIG. 7 performs step 114 to judge whether a fuel property change record exists. When there is a change in the alcohol concentration detected by the alcohol concentration sensor 54, it is assumed that a fuel property change record exists. If the judgment result obtained in step 114 does not indicate that a fuel property change record exists, the current processing cycle comes to an immediate end because it can be concluded that the employed fuel does not possibly change.

If, on the other hand, the judgment result obtained in step 114 indicates that a fuel property change record exists, it can be concluded that the fuel injected from the injector 26 will change to a new type in a short time. In this instance, step 116 is performed to calculate the cumulative fuel consumption amount that is reached since there was a change in the alcohol concentration detected by the alcohol concentration sensor 54. Next, step 118 is performed to judge whether the cumulative fuel consumption amount has reached a first judgment value. The first judgment value and a second judgment value, which will be described later, are predetermined in consideration of the cubic capacity of the fuel path between the alcohol concentration sensor 54 and the leading end of the injector 26.

If the cumulative fuel consumption amount has not reached the first judgment value, the previous fuel remaining downstream of the alcohol concentration sensor 54 is still not consumed. Therefore, it can be concluded that the previous fuel is being still injected. In this instance, the current processing cycle comes to an immediate end because it is still not necessary to limit the throttle opening.

As fuel consumption progresses in the internal combustion engine 10, the judgment result obtained in step 118 soon indicates that the cumulative fuel consumption amount has reached the first judgment value. In this instance, step 120 is performed to judge whether the cumulative fuel consumption amount has reached the second judgment value. The second judgment value, which is greater than the first judgment value, is predetermined as the value indicating that the fuel is replaced with a new one with the previous fuel remaining downstream of the alcohol concentration sensor 54 entirely consumed.

If the judgment result obtained in step 120 does not indicate that the cumulative fuel consumption amount has reached the second judgment value, it can be concluded that it is still not possible to definitely determine whether the fuel injected from the injector 26 has changed to a new one. In this instance, the routine proceeds to step 122. In step 122, control is exercised to limit the throttle opening in the same manner as in step 104 for the first embodiment. Since this avoids an entry into the fuel increase region where air-fuel ratio feedback control is stopped, it is possible to definitely protect the catalyst 38. In other words, the present embodiment provides the same advantages as the first embodiment.

As fuel consumption further progresses in the internal combustion engine 10, the judgment result obtained in step 120 soon indicates that the cumulative fuel consumption amount has reached the second judgment value. In this instance, it can be concluded that the fuel injected from the injector 26 is definitely changed to a new one. Step 124 is then followed to perform a process for correcting the fuel injection amount to provide an appropriate air-fuel ratio for the new fuel in accordance with the alcohol concentration detected by the alcohol concentration sensor 54.

After the fuel injection amount is corrected in step 124, an appropriate air-fuel ratio can be provided for the new fuel even when fuel increase is performed. It is therefore unnecessary to limit the throttle opening. In this instance, step 126 is first performed to clear the fuel property change record (so that no fuel property change record exists). Next, step 128 is performed to lift the limit on the throttle opening in step 122.

Step 118 of the routine shown in FIG. 7 may alternatively be skipped. More specifically, step 122 may be performed to limit the throttle opening immediately after a change in the alcohol concentration (fuel properties) is detected by the alcohol concentration sensor 54.

It is assumed that the third embodiment described above uses a returnless fuel system. However, when a return fuel system is used, the fuel in the fuel pipe 48 and delivery pipe 52 constantly circulates as mentioned earlier. Therefore, when an alcohol concentration change is detected by the alcohol concentration sensor 54, the previous fuel remains within the injector 26 only. In other words, when a return fuel system is used, the injected fuel changes to a new one within a shorter period of time after the detection of an alcohol concentration change than when a returnless fuel system is used. Therefore, when a return fuel system is used, the second judgment value used in step 120 is smaller than when a returnless fuel system is used.

In the third embodiment, which has been described above, the alcohol concentration sensor 54 corresponds to the "fuel property sensor" according to the third aspect of the present invention; and the second judgment value corresponds to the "predetermined judgment value" according to the fourth aspect of the present invention. Further, the "air amount limitation means" according to the third aspect of the present invention is implemented when the ECU 50 performs steps 114 and 122; the "consumption amount calculation means" according to the fourth aspect of the present invention is implemented when the ECU 50 performs step 116; and the "fuel injection amount correction means" according to the sixth aspect of the present invention is implemented when the ECU 50 performs step 124.

The invention claimed is:

1. A control system for controlling an internal combustion engine operable on various fuels that differ in stoichiometric air-fuel ratio, the control system comprising:
   a fuel property sensor which is installed in a fuel tank or a fuel path to detect fuel properties;
   air amount limitation means for limiting an intake air amount into cylinders of the internal combustion engine to below a predetermined air intake amount in response to a detection of a change in the fuel properties by the fuel property sensor; and
   consumption amount calculation means which calculates a cumulative fuel consumption amount in response to the detection of the change in the fuel properties by the fuel property sensor;
   wherein the air amount limitation means limits the intake air amount into the cylinders in response to the detection of the change in the fuel properties at least until the cumulative fuel consumption amount calculated by the consumption amount calculation means reaches a predetermined judgment value.

2. The control system according to claim 1, wherein the predetermined judgment value is predetermined as a value indicating that a previous fuel remaining downstream of the fuel property sensor has been entirely consumed and replaced by a new fuel.

3. The control system according to claim 1, further comprising:
   fuel injection amount correction means which corrects a fuel injection amount in accordance with the fuel properties detected by the fuel property sensor in response to the cumulative fuel consumption amount calculated by the consumption amount calculation means reaching the predetermined judgment value.

4. A control system for controlling an internal combustion engine operable on various fuels that differ in stoichiometric air-fuel ratio, the control system comprising:
   a fuel property sensor which is installed in a fuel tank or a fuel path to detect fuel properties; and
   a controller having control logic that limits an intake air amount into cylinders of the internal combustion engine to below a predetermined air intake amount in response to a detection of a change in the fuel properties by the fuel property sensor,
   wherein the controller having further control logic that calculates a cumulative fuel consumption amount in response to the detection of the change in the fuel properties by the fuel property sensor and limits the intake air amount into the cylinders at least until the cumulative fuel consumption amount reaches a predetermined judgment value.

5. The control system according to claim 4, wherein the predetermined judgment value is predetermined as a value indicating that a previous fuel remaining downstream of the fuel property sensor has been entirely consumed and replaced by a new fuel.

6. The control system according to claim 4,
   wherein the controller having still further control logic that corrects a fuel injection amount in accordance with the fuel properties detected by the fuel property sensor in response to a situation in which the further control logic calculates the cumulative fuel consumption amount to have reached the predetermined judgment value.

* * * * *